N. A. LYBECK.
OYSTER DREDGING MACHINE.
APPLICATION FILED JAN. 23, 1911.
1,070,271. Patented Aug. 12, 1913.
9 SHEETS—SHEET 1.
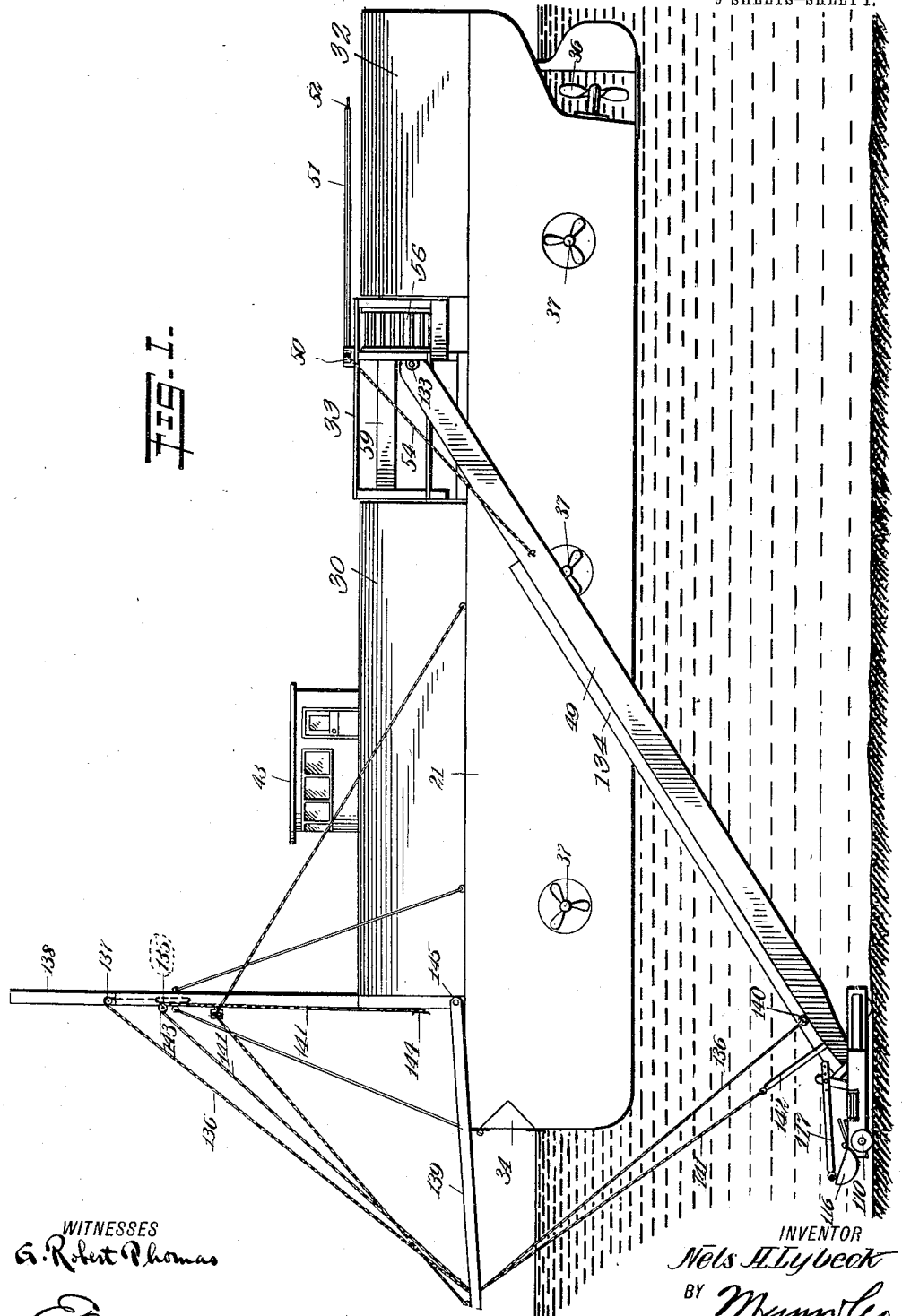
WITNESSES
G. Robert Thomas
E. S. Murdock
INVENTOR
Nels A. Lybeck
BY
Munn & Co.
ATTORNEYS N. A. LYBECK.
OYSTER DREDGING MACHINE.
APPLICATION FILED JAN. 23, 1911.
1,070,271.
Patented Aug. 12, 1913.
9 SHEETS—SHEET 2.
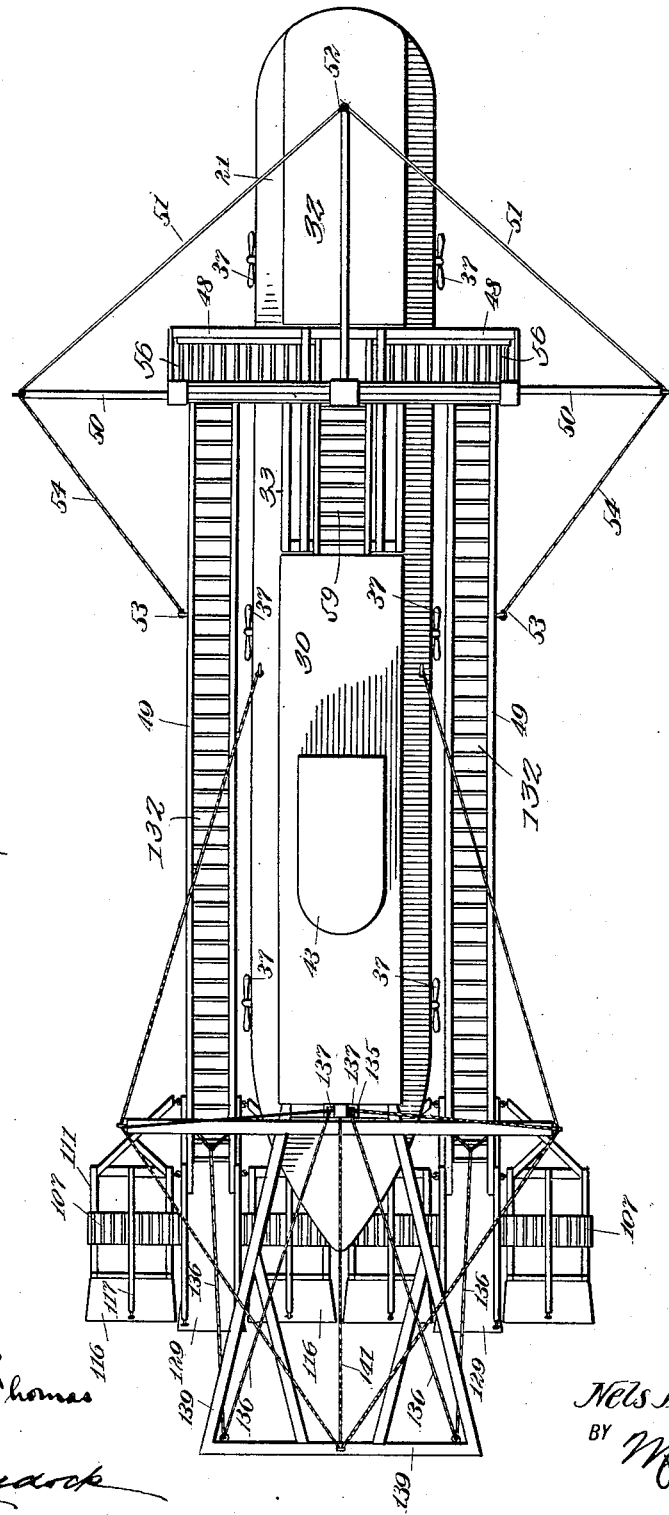

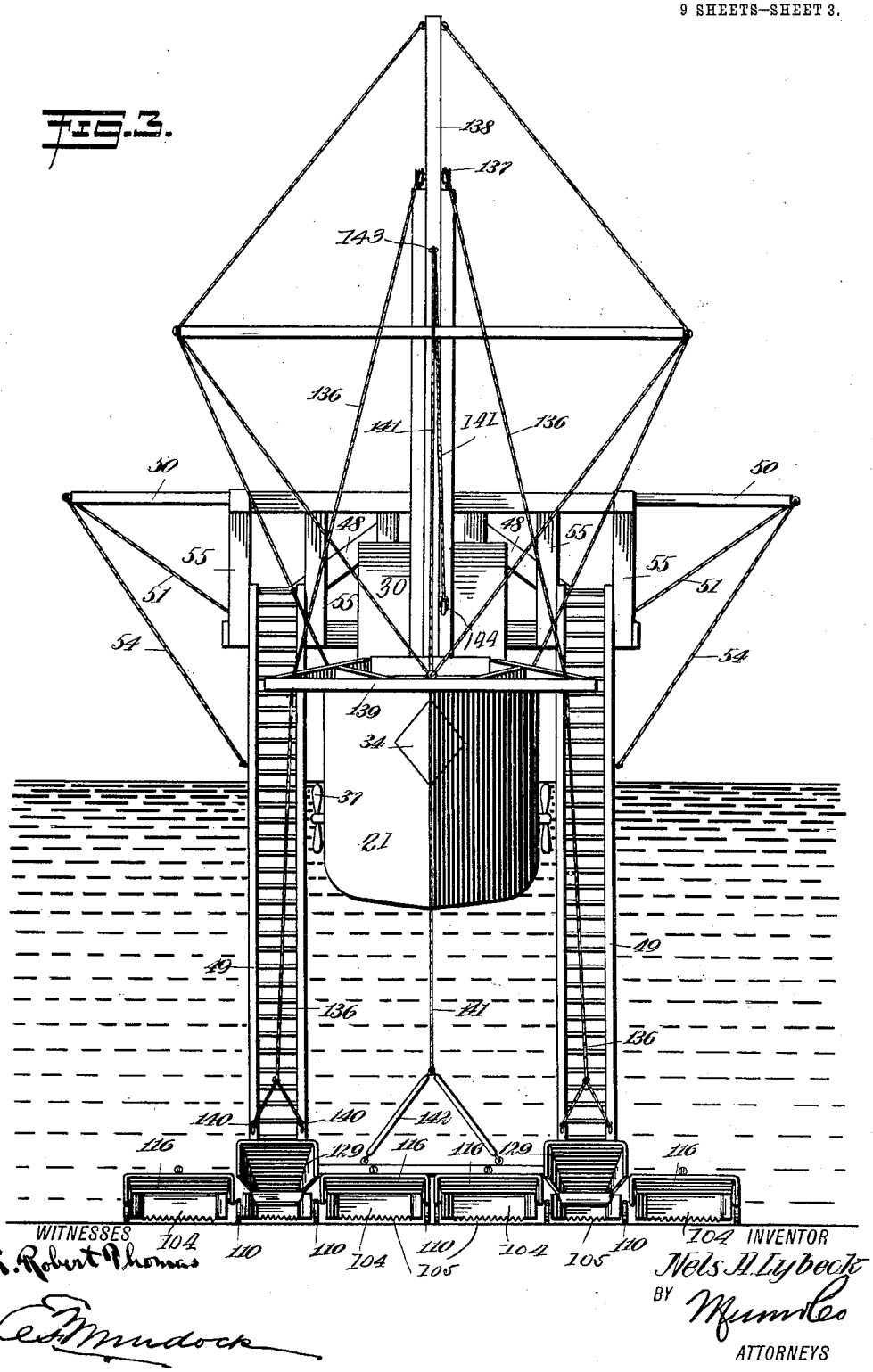

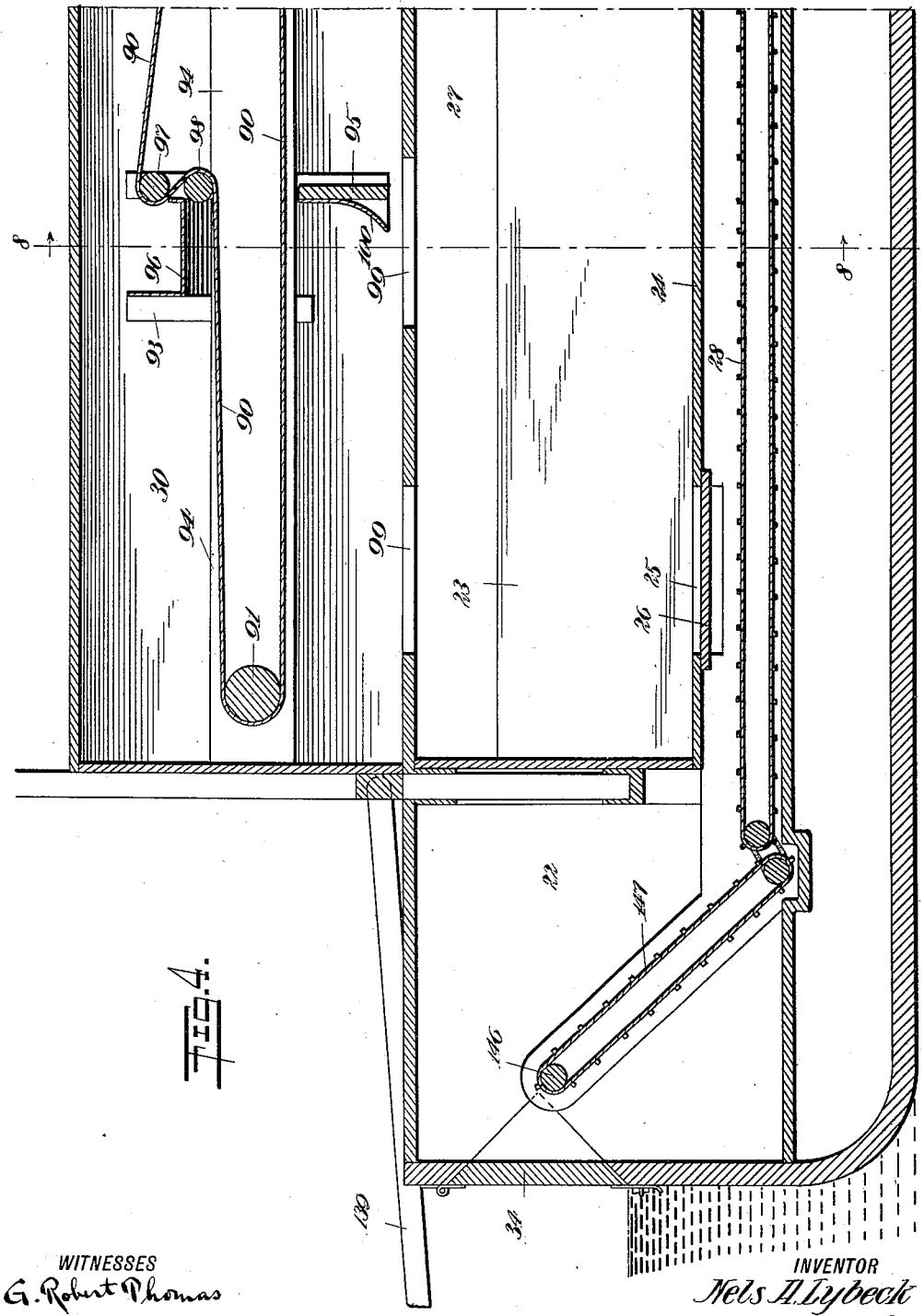

N. A. LYBECK.
OYSTER DREDGING MACHINE.
APPLICATION FILED JAN. 23, 1911.
1,070,271.
Patented Aug. 12, 1913.
9 SHEETS—SHEET 5.
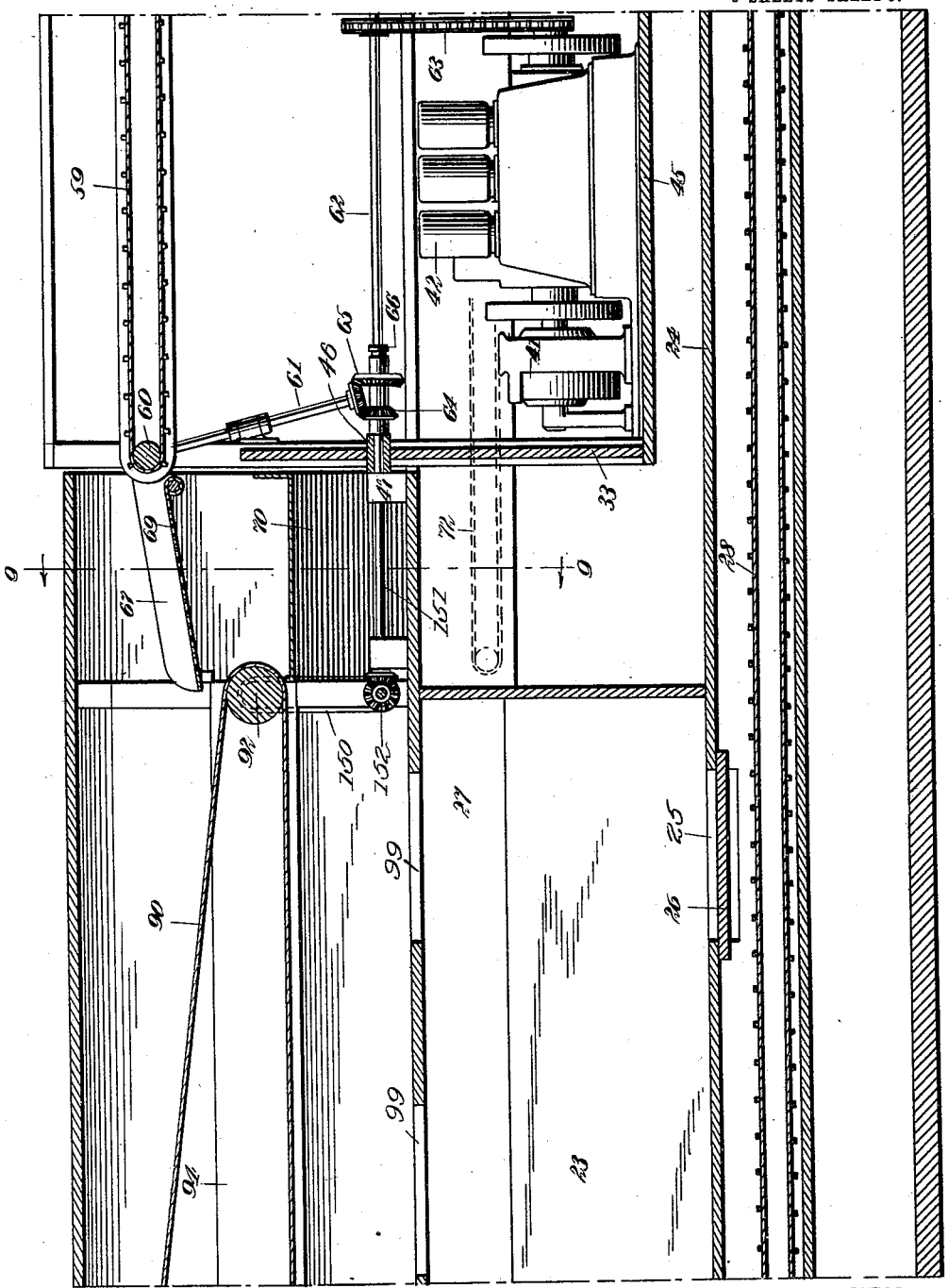
WITNESSES
G. Robert Thomas
C. F. Murdock
INVENTOR
Nels A. Lybeck
BY
Munn & Co
ATTORNEYS

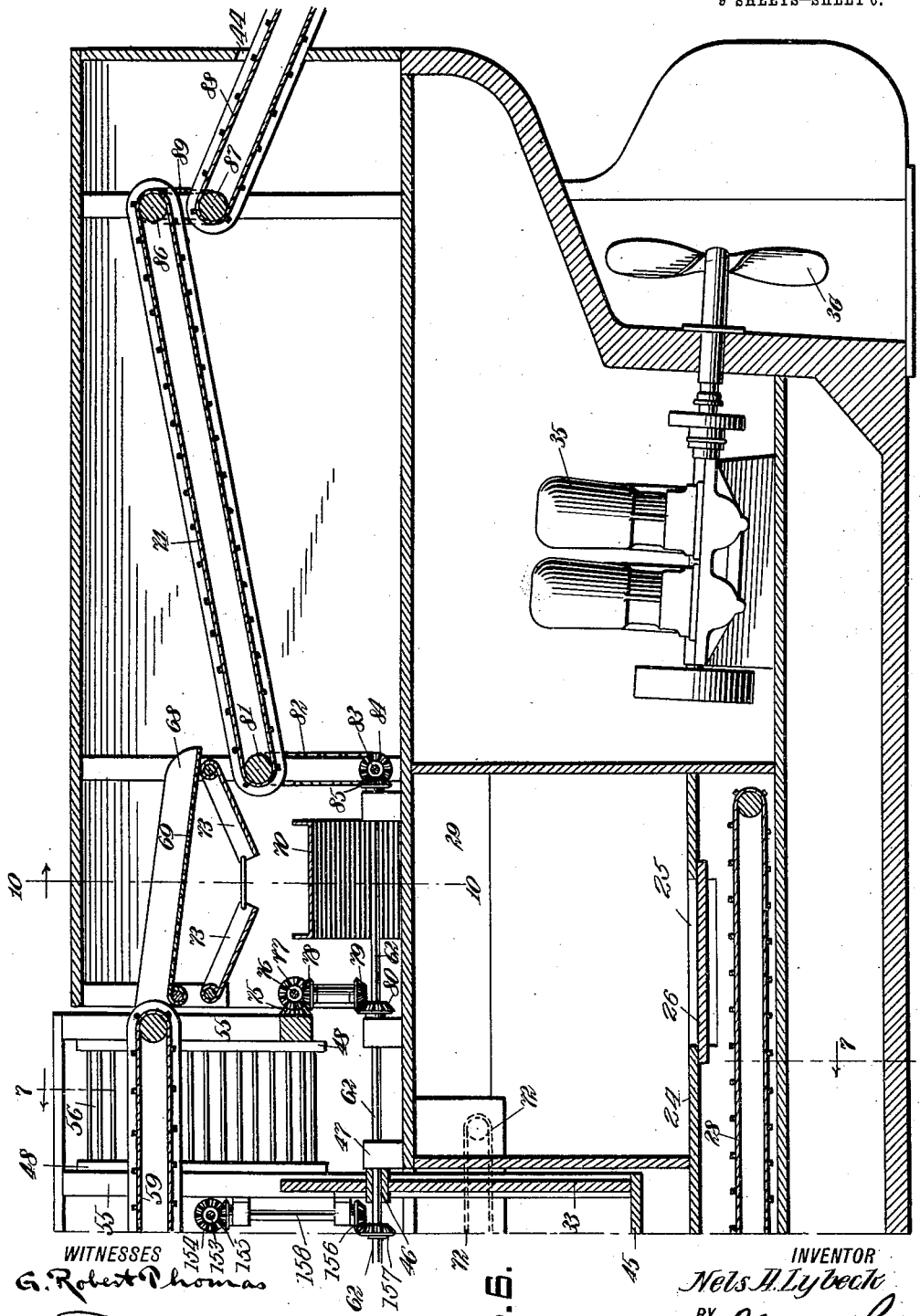

N. A. LYBECK.
OYSTER DREDGING MACHINE.
APPLICATION FILED JAN. 23, 1911.
1,070,271.
Patented Aug. 12, 1913.
9 SHEETS—SHEET 7.
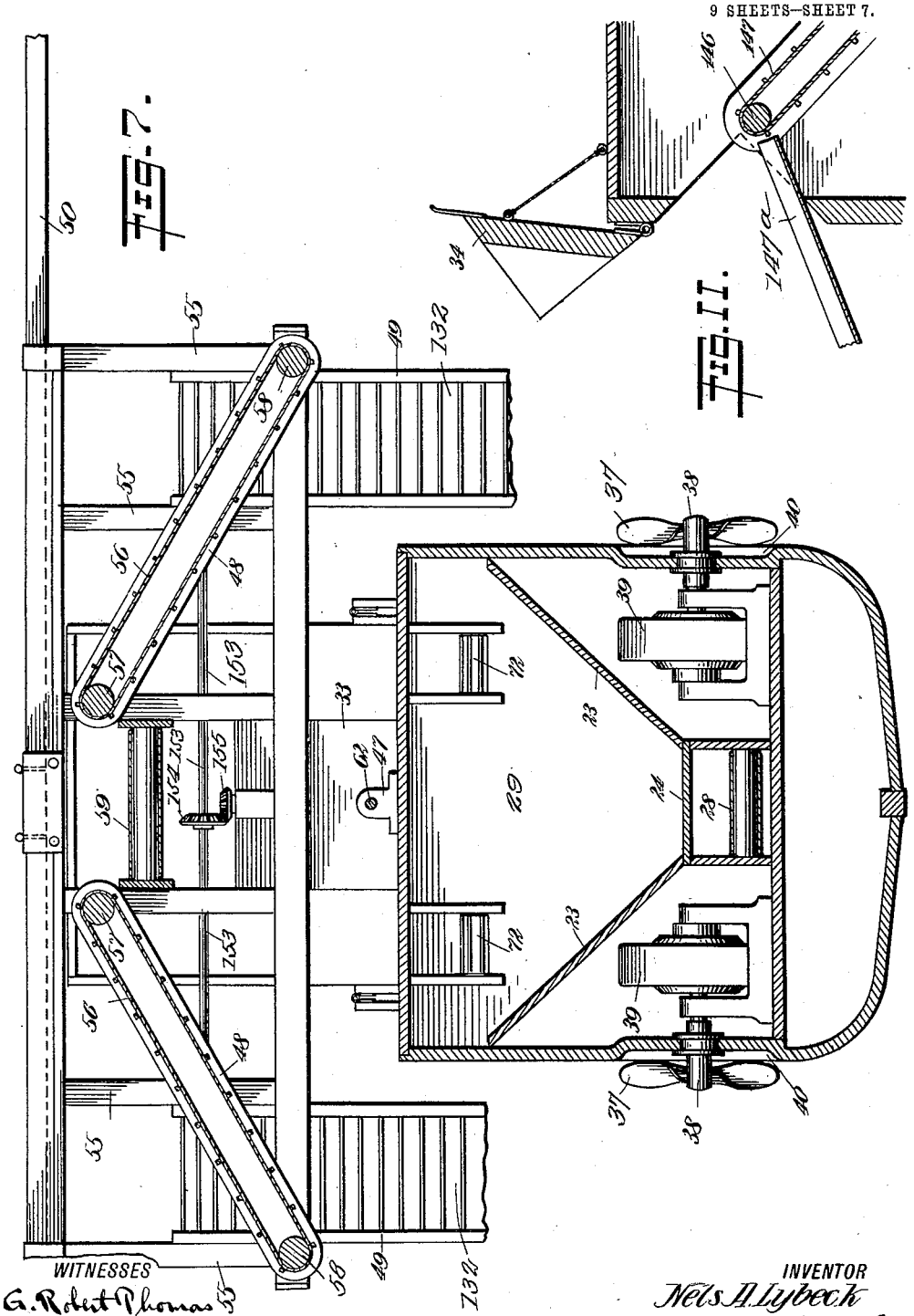
WITNESSES
G. Robert Thomas
C. F. Murdock
INVENTOR
Nels A. Lybeck
BY Munn & Co.
ATTORNEYS N. A. LYBECK.
OYSTER DREDGING MACHINE.
APPLICATION FILED JAN. 23, 1911.
1,070,271.
Patented Aug. 12, 1913.
9 SHEETS—SHEET 8.
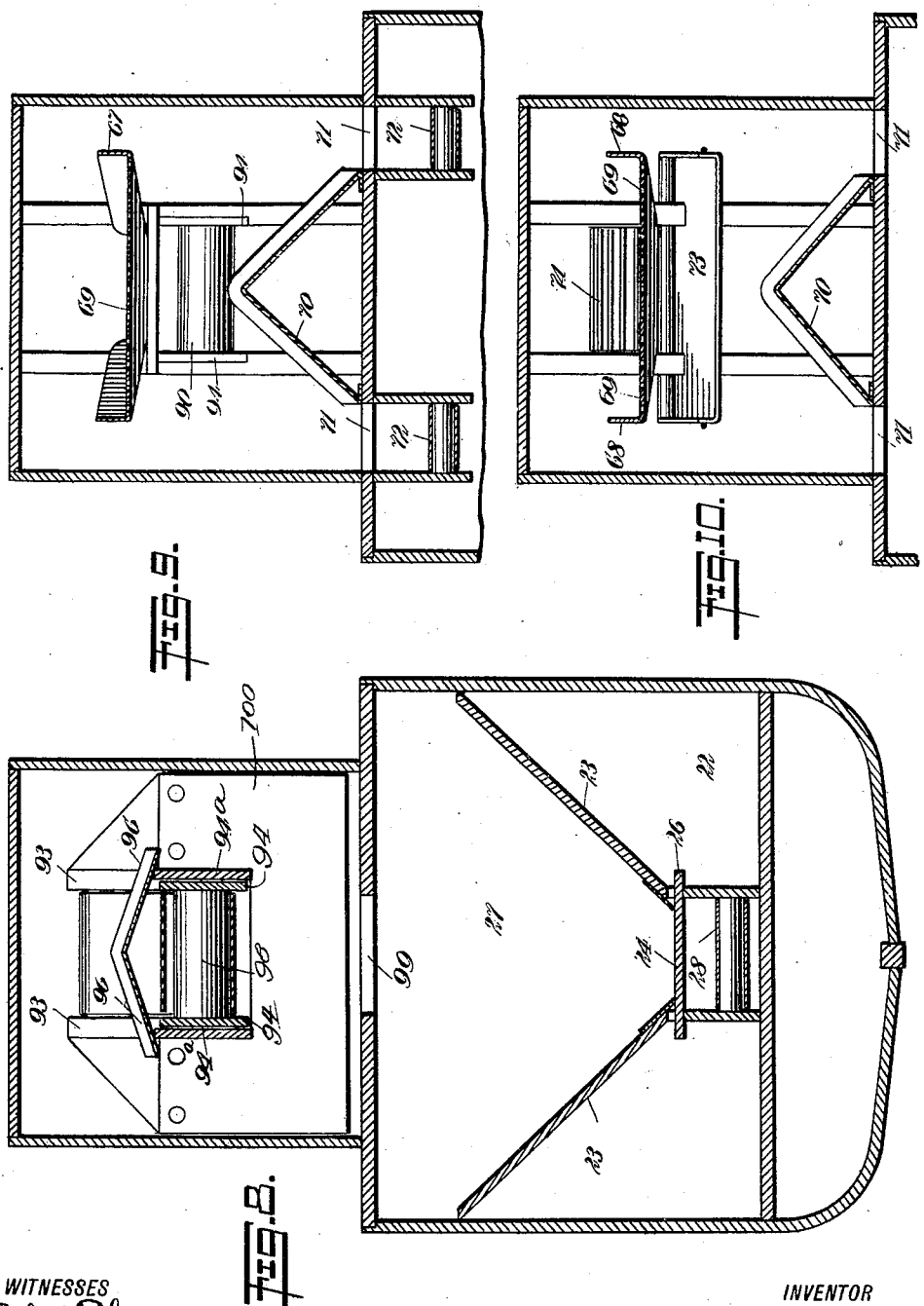
WITNESSES
INVENTOR
Nels H. Lybeck
BY
ATTORNEYS

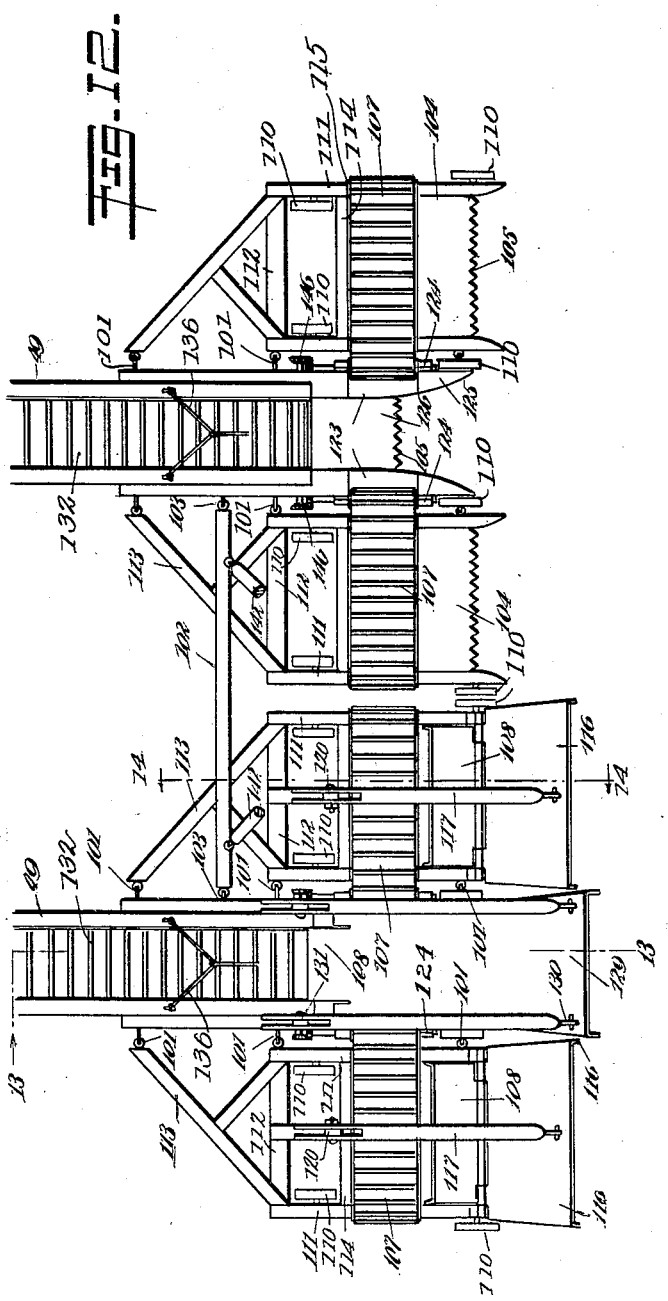

UNITED STATES PATENT OFFICE.

NELS A. LYBECK, OF BRISTOL, RHODE ISLAND.

OYSTER-DREDGING MACHINE.

1,070,271.

Specification of Letters Patent.

Patented Aug. 12, 1913.

Application filed January 23, 1911. Serial No. 604,232.

*To all whom it may concern:*

Be it known that I, NELS A. LYBECK, a citizen of the United States, and a resident of Bristol, in the county of Bristol and State of Rhode Island, have invented a new and Improved Oyster-Dredging Machine, of which the following is a full, clear, and exact description.

Among the principal objects which the present invention has in view are: to provide a continuous acting dredging excavating and elevating mechanism which may be attached or carried by a vessel of usual construction; to provide a machine of the character described which may be adapted for operation upon any of the usual vessels; to provide a system of excavating and elevating mechanisms arranged to operate on a wide-spread path extended below and to both sides of the supporting vessel; to provide a system of flexibly connected laterally extended dredging tools and delivery devices connected therewith for propelling the product of said dredging tools to said elevating mechanism; to provide excavating and elevating mechanisms adapted for pivotal connection to the said vessel at the rear thereof to push the dredging tools connected therewith from the stern portion of the vessel; and to provide a mounting for the excavating and elevating mechanisms of the character set forth adapted for attachment to a supporting vessel in a manner to permit the roll and pitch of the vessel without disturbing the arrangement of said mechanisms on the sea bottom.

One embodiment of the present invention is disclosed in the structure illustrated in the accompanying drawings, in which like characters of reference denote corresponding parts in all the views, and in which—

Figure 1 is a side view of a sea going vessel constructed and arranged in accordance with the present invention, and having attached thereto oyster dredging tools and elevator conveyers; Fig. 2 is a plan view of the same; Fig. 3 is a front view of the same; Figs. 4, 5 and 6 are a longitudinal vertical section of a vessel of the character described, constructed and arranged in accordance with the present invention; Fig. 7 is a cross section taken on the line 7—7 in Fig. 6; Fig. 8 is a cross section taken on the line 8—8 in Fig. 4; Fig. 9 is a cross section taken on the line 9—9 in Fig. 5; Fig. 10 is a vertical section taken on the line 10—10 in Fig. 6; Fig. 11 is a detail view, on an enlarged scale and in vertical section, of a fragment of the bow of the vessel, showing the bow port in open position; Fig. 12 is a detail view in plan, and on an enlarged scale, showing the clustered arrangement of the dredging tools, the group to the right of the figure being shown with the gathering hood removed; Fig. 13 is a vertical section taken on the line 13—13 in Fig. 12; and Fig. 14 is a detail view in vertical section taken on the line 14—14 in Fig. 12.

In an accompanying application, filed the 6th day of January, 1911, bearing Serial No. 601,062, entitled Submarine cultivator and harvester, I have described a preferred form of construction and arrangement of a machine for cultivating and tending submarine beds, and particularly those devoted to the propagation of oysters. Also, in said application I have described and claimed means for fishing for starfish, crabs, and similar inhabitants of the sea which usually float directly above or rest upon the sea bottom. I have indicated, in the above referred to application, that other tools than that disclosed in the said application could be employed in conjunction with the machine herein described. One of the tools referred to is disclosed in the accompanying drawings, to wit, the dredging scoop. In the application above referred to the vessel is built especially for the business to which it is employed. In the present application the vessel may be of any suitable type, the cultivating and harvesting attachments being applied thereto.

*The vessel.*—In the accompanying drawings, the vessel 21 is of any suitable construction, having a hold 22. The hold 22 is altered by constructing therein inclined hopper sides 23, 23, which are disposed, as best seen in Fig. 8 of the drawings, to guide the contents held between the said sides upon a centrally disposed platform 24. The platform 24 is provided at suitable intervals with delivery openings 25, 25, normally closed by slide doors 26, 26. It is through the openings 25, 25 that the bin 27 formed by the sides 23, 23 is emptied, the said doors delivering directly upon a belt conveyer 28. The belt conveyer 28 is extended under the bin 27 and the bin 29. The bin 29 is disposed in the after part of the vessel, and is employed for the reception, storage and delivery of foreign fish or articles raised with the oysters, for the dredging of which the present machine is employed.

The vessel 21 is provided with a deck house 30. The deck house 30 is provided for the operation of the loading conveyer 90. Interposed between the forward deck house 30 and the after deck house 32 is formed an open space for midships gangway in which is pivotally suspended the cradle frame 33. The bow of the vessel 21 is pierced and normally closed by a port door 34. Through the port which is closed by the door 34 is delivered the load contained within the vessel 21.

The vessel 21 is self-propelled, being driven by an engine 35 and a screw propeller 36 connected therewith. Means for operating and controlling the engine and propeller connected therewith are not shown in the accompanying drawings. Any suitable means may be adopted which will accomplish the desired result. If the vessel 21 be devoted to the trade herein mentioned, it is preferred that the same be provided with a series of propellers 37, 37 disposed, as shown particularly in Fig. 1 of the drawings, on the port side of the vessel, being constructed at the ends of shafts 38, 38 which are preferably connected to independent prime movers, such as the motors 39, 39 shown in Fig. 7 of the drawings. The side wall of the hull of the vessel is cut away, as shown at 40, if the propellers be not extended from the side of the vessel, in order that the water may flow behind the said propellers to be forced laterally from the vessel, forcing the same broad side. The dynamo for operating the various motors is indicated by the numeral 41, as seen in Fig. 5 of the drawings, and is preferably directly connected to the engine 42 by which the operating and distributing apparatus of the harvester are driven. The vessel is provided with a cabin or pilot house 43, and the various circuits for controlling independently or in batteries the motors 39 are carried to the pilot house to be there operated by the pilot or person in charge of the vessel.

In the employment of the vessel 21 the oysters are usually delivered to a tender which is trailed in the rear of the vessel a stern port opening 44 being provided for the extension therethrough of suitable chutes or belt conveyers.

*The cradle.*—The cradle consists of the frame 33, the floor 45 whereof supports the engine 42 and dynamo 41. The frame is pivoted in heavy bearings 46, 46 integrally formed with and extended from the heads of the shaft bearings 47, 47. Upon the bearings 46 the cradle is pivoted, the weight of the engine and dynamo maintaining the cradle in a constantly vertical disposition irrespective of the roll of the vessel 21. Should the weight of the engine and dynamo mentioned be insufficient to maintain the equilibrium of the cradle, this weight may be augmented by any suitable and most convenient method. The frame 33 is extended transverse the vessel 21, and is provided with extension frames having side pieces 48, 48, the said frames extending beyond the side of the vessel to overhang the same to receive in pivoted connection the elevators 49, 49. The elevators 49, 49 are disposed in parallel relation to the keel of the vessel, extending adjacent the sides of the vessel and projected from near the stern to the bow thereof. It is to prevent the elevators 49 swinging against the side of the vessel that the cradle is provided with the booms 50, 50. The booms 50, 50 are extended laterally, and are secured by means of guy lines 51, 51 from whipping, the said guy lines being anchored at 52, 52 on a boom provided for that purpose. The booms 50, 50 are connected at 53, 53 to the elevators 49, 49 by means of guy lines 54, 54. This rigging prevents the elevators 49 striking upon the hull of the vessel 21 which would operate to destroy the vessel or elevators.

*The distributing mechanism.*—The distributing mechanism is employed to receive the oysters and attached or allied fish or sea creatures as delivered from the elevators 49, 49. The elevators 49, 49 are pivoted between stanchions 55, 55. The upper ends of the elevators extend above and over the drapers 56, 56. The drapers 56, 56 are extended over rollers 57, 57 and 58, 58. The drapers 56, 56 are extended above the distributing conveyer 59. The conveyer 59 is driven by a roller 60, to which a transmission shaft 61 is operatively connected. The shaft 61 has connection with the roller 60 substantially similar to the connection between the said shaft and the main driving shaft 62, which is directly connected by a sprocket belt 63 with the driving shaft of the engine 42. The transmission from the driving shaft 62 to the transmission shaft 61 is through two loose bevel gear wheels 64, 65. The gear wheels 64 and 65 are operatively engaged by a double cone clutch 66 keyed to the shaft 62 and slidably, to engage alternately the one or other of the gear wheels 64, 65. According as the clutch 66 be engaged with the gear wheel 64 or 65 the conveyer 59 is moved to deliver its contents to a chute 67 or chute 68. The chutes 67 and 68 are each provided with a perforated bottom 69, 69. It is through the perforations in the bottoms 69, 69 that the foes, so styled, of the oysters are delivered. These foes are principally the sea creatures known as borers. Larger foes, such as starfish, are manually extracted from the belt of the conveyer 59 as the same pass from the delivery station of the drapers 56 to the chutes 67, 68. It will be understood that any small particles, such as refuse or pebbles, which may be lifted by the dredgers and delivered by the elevators and drapers upon the conveyer 59, are passed through the perforations of the chutes 67 and 68. Directly below the chutes 67 and 68 are disposed saddles 70, 70. The saddles 70, 70 are constructed in the form of double chutes, as best seen in Fig. 9 of the drawings, each leading to a hatchway 71, 71 through whence the refuse and foes are delivered to conveyer belts 72, 72. The belts 72, 72 extend from the forward saddle 70 to the bin 29 into which they deliver the load carried thereon. In this manner the refuse is eliminated from the oysters as the same are passed to the forward bin 27. The rearmost saddle 70 delivers directly into the bin 29 through openings in the deck.

Under the chute 68 are supported smaller chutes 73, 73, the converged openings whereof are disposed directly above the saddle 70, protecting in this manner the lower end of the conveyer 74 and the power transmission mechanism for driving the drapers 56, 56 and the conveyers 74, 74. The drapers 56, 56 are driven by the rollers 58, 58, upon the ends of which are bevel gear wheels 75, which are connected with a shaft 76 extended transverse the cradle, reaching to the lateral extremes thereof. Midway of the shaft 76 is a fixed bevel gear wheel 77, to which is geared a matched bevel gear wheel 78. The gear wheel 78 is mounted on the end of a shaft at the opposite end whereof a gear wheel 79 is fixedly connected. The gear wheel 79 is meshed with a gear wheel 80 fixedly mounted on the shaft 62. Thus, whenever the shaft 62 is driven, the rotation whereof is constant and always in one direction, the drapers 56, 56 are caused to travel constantly and ever upward.

The conveyer 74 is driven by a roller 81, which is connected by means of a sprocket chain 82 to a counter-shaft 83. The shaft 83 is disposed transverse the vessel and at an angle of 90° to the shaft 62 to which it is operatively connected by means of matched bevel gear wheels 84 and 85, the former of which is fixedly mounted on the shaft 83 and the latter fixedly mounted on the shaft 62.

A drum 86 forms the outer and upper support of the conveyer 74, and is driven by the said conveyer. A drum 87 supports the inner end of the conveyer 88, which is extended through the port 44, and by which the dredged product is delivered from the vessel 21 and to a following tender. The drums 86 and 87 are operatively connected by a sprocket chain 89.

With the operation of the engine 42 the shaft 62 is constantly operated, turning in unison therewith and constantly in one direction the belts of the elevators 49, the drapers 56, 56, the conveyer 74 and the conveyer 88. In accordance with the disposition of the clutch 66 the conveyer 59 is operated in unison with the said drapers and conveyers, but in either a direction to deliver the product to the chute 68 and from thence over the conveyers 74 and 88 to the rearwardly disposed tender, or forwardly over the chute 67 to deliver the same upon the belt 90 of the loading mechanism.

*The loading mechanism.*—The loading mechanism consists primarily of the elongated endless belt 90. The belt 90 is supported by main rollers 91, 92 and in suitable intermediate devices. The roller 92 is operated by the shaft 62. The transmission mechanism connecting the said roller and shaft consists in the belt 150, the countershaft 151 and the miter gears 152 operatively connecting the shafts 151 and 62, as seen best in Fig. 5. The upper reach of the belt 90 is supported in part by the load distributer. The load distributer is best seen in Figs. 4 and 8 of the drawings, and consists in uprights 93, 93, cheek pieces 94$^a$, 94$^a$ and a connecting push board 95 and chutes 96. The guide rails 94, 94 support the distributers and double extended chutes 96, 96 thereof which are disposed below the upper fold of the belt 90 where the same crosses over a roller 97. Disposed below and slightly to the rear of the roller 97 is a second roller 98, back of which the belt 90 is reeved, substantially as shown in Fig. 4 of the drawings. By reason of this arrangement the load carried on the belt 90 is deposited upon the chute 96 to be distributed laterally thereby within the deck house 30. Also, it will be observed by reference to the drawings, the material is deposited to the far side of the push board 95. Communicating between the deck house 30 and the bin 27 at frequent intervals are hatchways 99, through which the material is delivered into the bin 27.

In the operation of the loading mechanism the evener is manually placed at the forward end of the deck house 30. When the conveyer 59 is so driven as to deliver the product upon the belt 90 the said product is dumped from the belt as the same passes over the roller 97. The double chute 96, 96 delivers the product evenly to both sides of the median line of the belt 90. As the deck house 30 becomes filled with the product the same is precipitated through the hatchway 99 into the bin 27. It is not until the bin 27 below the first of the hatchways 99 is completely filled that the load begins to raise upon the deck forming the floor of the house 30 on the far side of the push board 95. It will be observed that the push board 95 is faced with an outwardly curved metal plate 100, shaped to receive the weight of the load. When the weight of the product on the push board 95 is sufficient to move the same, the push board is forced backward from the forward end of the house toward the conveyer 59. This operation proceeds relatively actively until the second of the hatchways 99 is exposed. The product is then precipitated through the said second hatchway, until that section of the bin 27 being filled, the product backs up into the house 30 forward of the push board, to again gradually crowd the same backward from the forward end of the house 30. In this manner the bin 27 and the house 30 are gradually filled to the load line, but to the load line only. Throughout the action of the evener it will be observed that the operation is automatic, depending solely on the weight of the product on the forward side of the push board 95.

*The dredging mechanism.*—The dredging mechanism shown in the accompanying drawings consists primarily of the dredging and delivery scoops shown respectively in Figs. 14 and 13 of the drawings. As shown in Fig. 12 of the drawings, the scoops are arranged in parallel order and in groups, a dredger scoop being disposed at each side and on both sides of a delivery scoop. The scoops are pivotally connected by eyelets 101, 101, permitting thereby a lateral play of the scoops, harnessing in this manner a number of scoops to extend over a transverse area in the path of and below the vessel 21, arranged to accommodate the irregularities of the shape of the bottom or bed. A set of scoops is connected to each of the elevators 49, 49. When the two elevators 49, 49 are employed, as shown in the accompanying drawings, the two sets of scoops are connected by a link bar 102. The link bar 102 is pivotally mounted by eyelets 103, 103 to the frame of the delivery scoops, as seen best in Fig. 12 of the drawings. The link bar 102, in conjunction with the guy lines 54, 54, steady the action of the elevators 49, 49, preventing any relative lateral displacement thereof with reference to the cradle and the vessel 21, while permitting the needed flexibility on the part of the sets and component members of the sets of scoops.

The dredging scoops are provided each with a metal apron 104. The aprons 104 are each provided with a serrated or tooth-like forward edge 105. The edge 105 may be substituted by a tine-like construction adapted to rake under and lift the oysters from the bed. The body of the apron is inclined backwardly, and is provided with a curled edge 106 extended over transversely disposed conveyer belts 107. Disposed above the apron 104 is a funnel top 108. The funnel top 108 converges toward the upper edge of the apron 104 to form a throat or mouth for the delivery of the product upon the conveyer belt 107. The apron 104 and the top 108 are rigidly mounted upon the frame 109. The frame 109 is rectangular and elongated in shape, having provided for the support thereof wheels 110, 110. Extended rearwardly from the frame 109 are handle bars 111, which are connected at the rear by a cross brace 112 and by an inclined brace 113, on the rearward end whereof is mounted the pivoting eyelets 101. Transversely disposed between the framing members of the frame 109 are headers 114, 114. Between the headers 114 are pivotally mounted the rollers 115, supporting and operating the conveyer belts 107, 107.

To assist in creating the current of water needed to lift the oysters over the apron 104 is a hood 116. The hood 116 is pivotally connected, as shown in Fig. 14 of the drawings, to the top 108, and is pivotally connected to an adjusting arm 117 whereby the said hood is lifted to gather thereunder the increased amount of water to cause the same to spurt through the constricted opening between the top 108 and the apron 104. The arms 117 are provided with a series of perforations 118, through which a bolt 119 is passed for uniting the arm 117 to a post 120. The post 120 is braced by a corner brace 121, as shown. By moving the bolt 119 to one or the other of the different perforations 118 the hood 116 may be lifted or lowered to increase or diminish the force of the current trapped and directed through the throated opening between the top 108 and the apron 104. The current thus produced between the top 108 and the apron 104 lifts the oysters on the apron 104 upward over the same and above the conveyer belt 107. It is to prevent the oysters being carried over the belt 107 that I have provided the screen backing 122.

The conveyer belts 107, 107 are extended laterally into the passages 123, 123 of the delivery scoop. The belts 107 are driven by rollers 124, 124 which are pivotally mounted on the sides of the framing members 125, 125 of the said delivery scoop. The delivery scoop is provided with an apron 126, at the lower end whereof is formed a serrated edge 105, the function whereof is the same as the apron 104 above described. Disposed between the framing members 125, 125 is a table 127, upon the inner end whereof the said conveyer belts 107, 107 converge and deposit the load carried thereby.

It is to produce a delivering current over the table 127 that I have provided a hood 128, the top 129 whereof is raised or lowered, as the case may be, by shifting the bolt 119 in the perforations 118 to shorten the distance between the eyelet 130 at the nose of the hood and the post 131 at the rear of the structure.

The operation of the hood 128 is in all respects similar to the operation of the hood 116. The water current created by the employment of the hood 128 differs only from that produced by the hood 116 in that the product delivered by the belts 107, 107 upon the table 127 is first swept from the said table into the throat formed by the upper edge of the apron 126, and together with the product being delivered by the apron 126, the current wherefor is produced for the under side of the table 127, is delivered upon the belt 132 of the elevators 49.

The elevators 49, 49 are pivotally mounted at 133 on each side of the vessel 21, and at the lateral extremes of the cradle above described. The elevators are provided with a ridge-shaped cover 134, by means of which the pressure of the water due to the progress of the vessel therethrough is deflected from the belts 132, preventing the product being swept from the said belts. It will be understood that the belts 132, 132 are formed from any suitable open mesh or linked construction. The belts 132, 132 are driven by the shaft 153, the miter gear wheels 154, 155, 156 and 157 and the transmission shaft 158 of the driving mechanism. The belts 107, 107 are operatively connected with the belts 132 to operate in unison therewith by means of meshed miter gear wheels 146, 146. By these gear wheels the shaft on which are mounted the rollers 124, 124 is operatively connected with the lowermost guide roller of the belts 132, 132. It will be understood that the shafts on which the lowermost idler rollers for the belts 132 are mounted also constitute a pivot connection for the elevators 49 and the dredging and delivery scoops. The arrangement of the gear wheels 146 and the shafts connected therewith is such that the movement of the two oppositely disposed conveyers 107 is toward the common center.

The weight of the elevators 49, 49 is counter-balanced by the dead weights 135, 135. The weights 135, 135 are disposed at the ends of cables 136, which are reeved over pulleys 137 in a mast 138. The cables 136, 136 are guided through the boom frame 139, 139 and are anchored at the eyelets 140, 140 on the rails of the elevators 49, 49. It will be noticed by reference to Fig. 1 of the drawings that the pull of the cables 136 upon the ends of the elevators 49 is in a forward lifting direction. Whenever the vessel is at a standstill the weights 135 lift the lower and forward end of the elevator to near the surface of the water before the weight is counter-balanced. It will be noticed that the weights 135 may be augmented or decreased. When, however, the vessel is propelled ahead the pressure of the water against which the elevators are pushed forces the ends of the elevators to the bottom, causing the scoops connected therewith to rest lightly in operative position upon the said bottom. By reason of this construction the scoops are protected against being wrecked by striking upon any obstruction in the bottom or bed.

To lift the elevators 49, 49 the cable 141 is provided. The cable 141 is pivotally connected to the bridle 142, and is reeved over suitable pulleys in the boom frame 139, and over a pulley 143 to be carried to near the deck and secured upon a belaying block 144. When the free end of the cable 141 is drawn upon the scoop bearing end of the elevators are lifted. When in the course of this operation the elevators strike under the boom frame 139, this is lifted, pivoting on the pivot pins 145.

It may be remarked in this connection, that the oyster dredging and delivery scoops herein shown and described may be substituted for any other suitable and desired tool for cultivating or harvesting the product planted or found at the sea bottom.

*The unloading mechanism.*—Under the bins 27 and 29, and in line with the openings 25, 25 therein, is the belt conveyer 28. The conveyer 28 is that which is provided to unload the vessel 21. The conveyer 28 delivers direct to the elevator conveyer 147, the upper end whereof is disposed adjacent to the port opening closed by the port door 34. It is when unloading the vessel 21 that the elevators 49, 49 and boom frame 139 are lifted in line with the mast 138. In this manner the port opening is freed for the introduction of the suitable draper or conveyer, 147ª either operatively connected with the roller 146 or with a suitable driving mechanism located on the shore, dock or lighter employed to receive the load.

Having thus described my invention, what I claim as new and desire to secure by Letters Patent is:—

1. An oyster dredging machine embodying a floating supporting vessel having a storage hold and an elevating mechanism, comprising a cradle pivotally mounted upon said vessel to overhang the sides thereof; a plurality of elevator conveyers pivotally mounted upon said cradle at the extended ends thereof; and a plurality of dredging tools pivotally mounted on said elevator conveyers, said tools being adapted to lift the product being handled for delivery to said elevator conveyers.

2. An oyster dredging machine embodying a floating supporting vessel having a storage hold and an elevating mechanism, comprising a cradle pivotally mounted upon said vessel to overhang the sides thereof; a plurality of elevator conveyers pivotally mounted upon said cradle at the extended ends thereof; and a plurality of dredging tools pivotally mounted on said elevator conveyers and adapted to be disposed across the path of said vessel, said tools being adapted to lift the product being handled for delivery to said elevator conveyers.

3. An oyster dredging machine embodying a floating supporting vessel having a storage hold and an elevating mechanism, comprising a cradle pivotally mounted upon said vessel to overhang the sides thereof; a plurality of elevator conveyers pivotally mounted upon said cradle at the extended ends thereof; a plurality of dredging tools pivotally mounted on said elevator conveyers, said tools being adapted to lift the product being handled for delivery to said elevator conveyers; a distributing mechanism embodying conveyers operatively mounted on said cradle for delivering the product in various directions; and a driving mechanism for said distributing mechanism.

4. An oyster dredging machine embodying a floating supporting vessel having a storage hold and an elevating mechanism, comprising a cradle pivotally mounted upon the hull of said vessel to overhang the sides thereof, said cradle being disposed near the stern of said vessel; a plurality of elevator conveyers embodying rigid boom-like structures pivotally mounted upon said cradle and adapted to extend beyond the bow of said vessel; and a plurality of dredging tools pivotally mounted on said elevator conveyers, said tools being adapted to lift the product being handled for delivery to said elevator conveyers.

5. An oyster dredging machine embodying a floating supporting vessel having a storage hold and an elevating mechanism, comprising a cradle pivotally mounted upon the hull of said vessel to overhang the sides thereof, said cradle being disposed near the stern of said vessel; a plurality of elevator conveyers embodying rigid boom-like structures pivotally mounted upon said cradle and adapted to extend beyond the bow of said vessel; and a balancing mechanism for supporting the tool bearing ends of said elevator conveyers, said mechanism embodying a connecting cable reeved over the vessel structure and a compensating weight suspended upon the free end of said cable.

6. An oyster dredging machine embodying a floating supporting vessel having a storage hold and an elevating mechanism, comprising a cradle pivotally mounted upon the hull of said vessel to overhang the sides thereof, said cradle being disposed near the stern of said vessel; a plurality of elevator conveyers embodying rigid boom-like structures pivotally mounted upon said cradle and adapted to extend beyond the bow of said vessel; a balancing mechanism for supporting the tool bearing ends of said elevator conveyers, said mechanism embodying a connecting cable reeved over the vessel structure and a compensating weight suspended upon the free end of said cable; and a cover for said elevator conveyers adapted to receive the pressure of the water when the machine is moved forward to sink the tool bearing end of the same.

In testimony whereof I have signed my name to this specification in the presence of two subscribing witnesses.

NELS A. LYBECK.

Witnesses:
  PHILIP D. ROLLHAUS,
  E. F. MURDOCK.

---

Copies of this patent may be obtained for five cents each, by addressing the "Commissioner of Patents, Washington, D. C."